United States Patent Office 2,992,080
Patented July 11, 1961

2,992,080
METHOD OF IMPROVING THE PURITY OF SILICON
Carlyle S. Herrick, Alplaus, N.Y., assignor to General Electric Company, a corporation of New York
No Drawing. Filed July 25, 1958, Ser. No. 751,087
6 Claims. (Cl. 41—42)

This invention relates to high purity silicon and more particularly to a method of improving the purity of silicon produced by the zinc reduction process.

Silicon has found wide application in electronic equipment such as transistors, diodes, rectifiers, and the like, with the application and use being generally dependent upon the degree of purity of the silicon. Therefore, for silicon to be of value as a material in high quality semiconductor devices, it must generally contain less than one electrically active foreign atom for every $10^8$ atoms of silicon.

One of the more common processes for chemically purifying silicon has been the reduction of silicon tetrachloride with zinc, the reaction taking place at 1740° F., well below the melting point of silicon, but above the boiling point of zinc, zinc chloride and silicon tetrachloride. The zinc chloride formed from the reaction and any excess zinc or silicon tetrachloride is carried off as vapor while the silicon is deposited on the bottom of a reactor chamber in the form of needle-shaped crystals. What is generally considered as pure silicon made by the zinc reduction of silicon tetrachloride, may retain only one part per billion of the elements in groups III and V of the periodic table of the elements, and generally a comparable amount of most remaining elements except that carbon, hydrogen, and oxygen are known to be present to the extent of 1 part per 10,000.

Accordingly, it is an object of this invention to increase the purity of silicon produced by the zinc reduction process.

It is another object of this invention to particularly remove the carbon impurity in silicon obtained by the zinc reduction process.

It is another object of this invention to employ etching as an impurity removal process in silicon produced by the zinc reduction method.

Briefly described, this invention in one form includes the removal of a SiC (silicon carbide) film from a silicon rod by etching away a layer of silicon beneath the film.

This invention will be better understood when taken in connection with the following description.

When a silicon specimen is heated in a vacuum chamber, various degrees of surface film formation may be observed. Out-gassing of silicon when heated under a vacuum was observed by ionizing in an electrical field. The out-gas flow was generally copious for extended periods of time, including 8 hours, and thereafter decreased gradually until none was noticeable by visual perception. This gas was believed to be SiO which is volatile under these temperature conditions and in equilibrium with silicon and $SiO_2$ (silicon dioxide) and, if these conditions are assumed to be true, then there should be no $SiO_2$ residue from the out-gassing process. Conversely, if the film was $SiO_2$, then the ionizing gas must be other than SiO.

Previously, this film formation has been attributed to silicon dioxide, but in the course of investigation it has been identified as a form of silicon carbide, and particularly as "beta silicon carbide." The identification was made by the well-known infrared spectrum analysis method and by X-ray diffraction. The film is removed from the silicon rod by etching away a layer of silicon beneath the film. The method of removing the film includes heating the silicon rod in a vacuum below its melting point, then cooling the silicon to room temperature and etching. The standard etching solution employed comprised nitric acid, hydrofluoric acid, and water, specifically 4 parts by volume nitric acid, 1 part hydrofluoric acid and 5 parts water, where the nitric acid is the standard 36% nitric acid and water solution, and where the hydrofluoric acid is the standard 50% solution in water. The degree of removal is dependent not only upon the heating temperature, but also upon the time of exposure of the silicon to the vacuum and heating.

The following examples are given as methods of removing the silicon carbide formed.

*Example 1.*—A small silicon bar was placed in a vacuum chamber and heater to ca. 1,000° C. at about 1–20 microns of mercury absolute for a period of 48 hours. Thereafter, the silicon bar was permitted to cool to room temperature and the carbide film removed by immersion in a standard etching solution of water, nitric acid, and hydrofluoric acid in 5:4:1 ratio, respectively.

*Example 2.*—A small silicon bar was placed in a vacuum chamber and heated to ca. 1,000° C. at about 1–20 microns mercury absolute and the temperature increased to approximately 1400° C. or just below the melting point of the silicon. These conditions were extended over a period of 72 hours, after which the silicon was permitted to cool to room temperature and the carbide film removed by etching with a standard etching solution of water, nitric and hydrofluoric acid of a 5:4:1 ratio, respectively.

The silicon carbide film is characterized in one respect as being an extraordinarily thin film and the etching process does not dissolve the film itself but a layer of silicon under the film so that the film is readily removable. This removal indicates that the silicon carbide forms only at the surface of the silicon bar, where it is easily removable and not in the interior. It is thus understood that the carbon in the silicon must first migrate to the surface before it can react with the silicon, and accordingly the vacuum condition is required for the migration. Similar examples employing one atmosphere of inert gas did not provide carbon migration. The form of the migrating carbon is not generally known, although it may be aliphatic, thus carrying the hydrogen with it. Mass spectrometer tests have detected carbon, and hydrogen vaporized when silicon was flash-heated in the instrument, indicating that the carbon has appreciable volatility under the conditions of the experiment.

When the procedure of Example 2 above is carried out, the silicon carbide diffuses from the surface film into the bulk of the silicon but to a low degree. The actual penetration in three days was measured and found to be only a few mils. It is thus important, however, in achieving the best purification, to etch the base silicon deeply enough to remove the diffused silicon carbide when using the process of Example 2. The separation is complete when the silicon surface readopts the original chemical polish.

Accordingly, by this invention, it has been shown that the residual film on a silicon rod produced by the zinc reduction method has been identified as silicon carbide and a new and novel method for removing the silicon carbide for greater purity silicon has been disclosed.

What I claim as new and desire to secure by Letters Patent of the United States is:

1. A method of removing carbon impurity in silicon which comprises heating the silicon under vacuum below its melting point, continuing the heating and evacuation until the carbon impurity has diffused to form a silicon carbide film on said silicon, cooling the silicon, and etching a layer of silicon beneath the said film for the removal thereof by subjecting the silicon to an etching solution.

2. A method of removing SiC film on silicon which comprises, heating the silicon to approximately 1000° C. under vacuum of approximately 1–20 microns of mercury absolute, maintaining the pressure and temperature for a period in excess of 24 hours, cooling the silicon to room temperature, and immersing the silicon in an etching solution to remove a layer of silicon beneath the covering film.

3. In the preparation of silicon from the reduction of silicon tetrachloride with zinc to form silicon, and where said silicon contains carbon as an impurity, a method of improving the purity of said silicon which comprises, reactng the carbon impurity in the silicon by heating in vacuo to form silicon carbide on the surface of the silicon, and removing the silicon carbide film thus formed by subjecting the silicon to a mineral acid etching solution to remove silicon below the silicon carbide.

4. A method of preparing improved purity silicon which comprises, reducing silicon tetrachloride with zinc to form silicon, heating the silocon under vacuum below its melting point to form a silicon carbide layer on its outer surface, cooling the silicon, and immersing the silicon in an etching solution of water, nitric acid and hydrofluoric acid to remove the outer film.

5. In the process of providing silicon by the reduction of silicon tetrachloride with zinc to form silicon, and where said silicon contains carbon as an impurity, a method of removing the carbon as an impurity which comprises, heating the silicon to approximately 1000° C. under a vacuum of 1–20 microns of mercury absolute, maintaining the temperature and pressure in excess of 24 hours, cooling the silicon to room temperature, and immersing the silicon in a 5:4:1 ratio by volume of water, nitric acid and hydrofluoric acid to remove the covering film.

6. The method of preparing improved purity silicon which comprises, reducing silicon tetrachloride with zinc to form silicon, heating the silicon to approximately 1400° C. at a pressure of 1–20 microns of mercury absolute, maintaining the temperature and pressure in excess of 48 hours, cooling the silicon to room temperature, and immersing the silicon in a 5:4:1 ratio by volume solution of water, nitric acid and hydrofluoric acid to remove the covering film.

References Cited in the file of this patent

UNITED STATES PATENTS

| | | |
|---|---|---|
| 2,402,582 | Scaff | June 25, 1946 |
| 2,773,745 | Butler | Dec. 11, 1956 |
| 2,808,315 | Bemski | Oct. 1, 1957 |

OTHER REFERENCES

Lyon et al. article in "Journal of the Electrochemical Society," vol. 96, No. 6, December 1949, pp. 359–363.